United States Patent [19]

Igel

[11] 4,288,817
[45] Sep. 8, 1981

[54] METHOD AND A DEVICE FOR ELIMINATING FIXED ERROR DISTURBANCES IN A PYROELECTRIC VIDICON

[75] Inventor: Anders N. E. Igel, Jarfalla, Sweden

[73] Assignee: U.S. Philips Corporation, New York, N.Y.

[21] Appl. No.: 31,267

[22] Filed: Apr. 18, 1979

[30] Foreign Application Priority Data

Apr. 26, 1978 [SE] Sweden ................. 7804820

[51] Int. Cl.³ .................. H04N 5/14; H04N 5/34
[52] U.S. Cl. .................... 358/163; 250/333; 250/334; 358/113
[58] Field of Search ............... 358/163, 113; 250/333, 250/334

[56] References Cited

U.S. PATENT DOCUMENTS

| | | | |
|---|---|---|---|
| 3,902,011 | 8/1975 | Pieters | 358/163 |
| 3,919,473 | 11/1975 | Cotter | 358/163 |
| 4,031,394 | 6/1977 | Felix | 358/113 |
| 4,040,087 | 8/1977 | Hall | 358/113 |
| 4,069,502 | 1/1978 | Nelson | 358/113 |
| 4,095,257 | 6/1978 | Back | 358/113 |
| 4,100,574 | 7/1978 | Felix | 358/113 |
| 4,164,753 | 8/1979 | Metcalf | 358/113 |

Primary Examiner—Howard Britton
Attorney, Agent, or Firm—Marc D. Schechter

[57] ABSTRACT

A signal processing method for eliminating fixed error sources in the video signal of a pyroelectric vidicon comprising the step of adding the signal value at each point of the pyroelectric plate to previous signal values relating to the same point for forming an integrated or mean value for a great number of signal values at each point and then subtracting the fixed error estimate from the signal values in the latest received video signal. This mean value, if differing from zero, is the estimate of the fixed error at the respective point.

14 Claims, 3 Drawing Figures

METHOD AND A DEVICE FOR ELIMINATING FIXED ERROR DISTURBANCES IN A PYROELECTRIC VIDICON

BACKGROUND OF THE INVENTION

The invention relates to a method of eliminating disturbances from fixed error sources in the video signal from an infrared (IR) camera of the pyroelectric vidicon type and a device for carrying out the method.

In an IR camera of the pyroelectric vidicon type a heat picture is produced upon a pyroelectric detector plate. This picture is read by means of a thin electron beam scanning the detector plate in the same manner as in a common TV camera tube, usually once every fiftieth of a second. A video signal representing the heat picture on the detector is obtained as an output signal. However, the video signal is not a measure of the absolute value of the temperature at each point of the plate but it is only a measure of the temperature variations with time. The pyroelectric vidicon therefore does not "see" stationary pictures but only variable pictures. In order to be able to see a stationary picture (i.e. to convert the stationary picture to a variable picture) there are two methods available. One method, which is called "chopping", involves alternately opening and closing a mechanical aperture or the like so that during every other frame the heat picture is projected on the detector plate, while during the intermediate frames the heat picture is not projected on the detector plate. The second method of converting a stationary picture to a variable picture which can be observed by means of a pyroelectric vidicon is to sweep the whole IR camera. This so called "panning" assures that new sections of the heat picture are continually projected on the detector plate. In the operation of such a camera each portion of the heat picture or image is represented by a spot on the detector and segment of the video signal. When sampling the video signal it is suitable to choose the sampling frequency so that each image portion comprises only one single sample of the video signal. A video signal picture frame (i.e. that part of the video signal which corresponds to a complete scanning of the heat picture) therefore will consist of some "spikes" in a signal which is otherwise zero (or has a reference value), or a number of samples differing from zero while remaining samples are equal to zero. Each such "spike" or "sample" different from zero represents an image portion.

But besides signal components in the video signal which represent the image, there are also error signals or disturbance signals, for example caused by internal errors in the camera such as inhomogeneities in the detector plate. These disturbances are assumed in the present case to be fixed (i.e. constant) from one picture scanning to the next picture scanning.

SUMMARY OF THE INVENTION

An object of the invention is to eliminate such fixed disturbances in the video signal from a pyroelectric vidicon.

According to the invention this is achieved by combining the instantaneous value of the video signal associated with each point of the pictures with a number of values of the video signal relating to the same picture point during previous scanning intervals. This combined signal has a value which is an integrated value or means value of the video signal for each point. This integrated value for each point is then subtracted from the latest value of the video signal the respective point.

The invention utilizes the fact that the error signal is fixed while the correct target signal varies from picture to picture. The error signal will therefore give a large contribution to the integrated value or mean value, while the correct target signal after a large number of additions will give a contribution which is negligible. The mean value therefore will be a measure of the error and can be subtracted from the video signal.

A device for carrying out the method according to the invention comprises a picture memory, a first adding means, and a second adding means. The picture memory is of the shift register or delay line type having a capacity for storing a video signal corresponding to a complete scan of the detector plate and having a delay which is equal to the time period for a complete scan of the detector plate. Two signals are applied to the first adding means to which is the instantaneous value of the video signal at each moment, and the output signal value from the picture memory at the same moment multiplied by a factor which is smaller than but almost equal to one. The output signal from the first adding means corresponds to the sum of the two signal components and it is fed as an input signal to the picture memory. Similarly, two signals are applied to the second adding means: the instantaneous value of the video signal at each moment, and the output signal from the picture memory at the same moment multiplied by a reduction factor which is substantially smaller than one for producing the difference between the two signal values, which difference signal is the corrected value of the video signal.

The correction will then be carried out point for point in real time and only one single memory is required.

If the multiplication factor of the first adding means is K the reduction factor of the second adding means is suitably chosen to be equal to (1−K) which will result in a theoretically exact error correction.

In digital systems the multiplication factor may be any of the numbers 15/16, 31/32 or 7/8.

The invention will now be illustrated by reference to the accompanying drawing.

DESCRIPTION OF THE PREFERRED EMBODIMENTS

Figure 1:
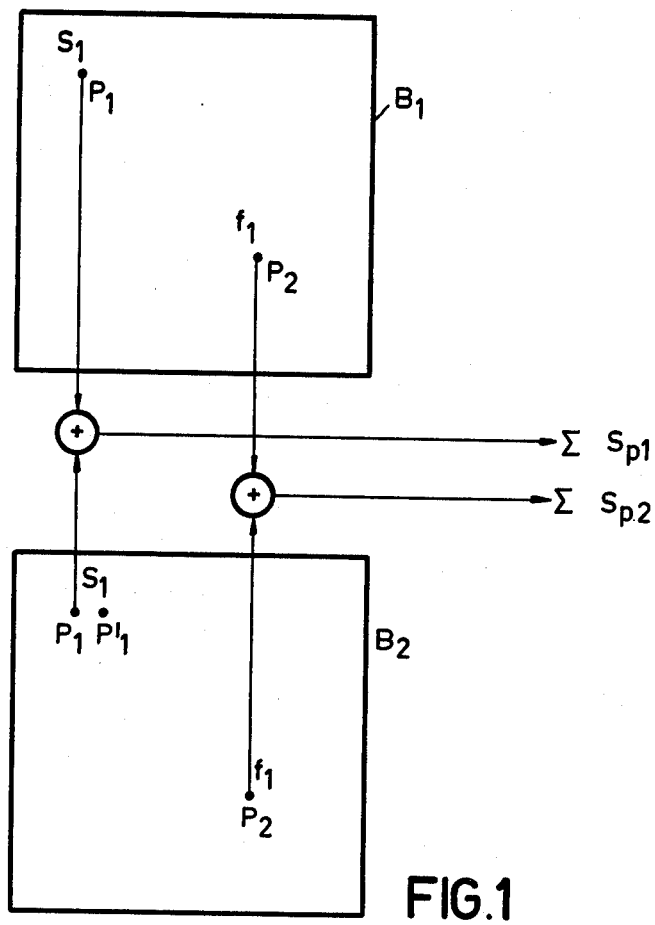
FIG. 1 is a schematic diagram illustrating the principle of generating an estimate of a fixed error in accordance with the principles of the invention.

FIG. 1 shows schematically two successive video pictures $B_1$ and $B_2$, of which $B_1$ is the later and $B_2$ is the earlier. At least picture $B_2$ is assumed to be stored in a memory. In the actual picture there is signal information only at two points designated. $P_1$ and $P_2$ in the picture $B_1$. The signal at $P_1$ has the value $S_1$ and is assumed to represent an image portion, i.e. corresponds to a point under heating on the plate. The signal at point $P_2$ has the value $f_1$ and is assumed to represent a fixed error caused for example, by inhomogeneities in the detector plate. The camera is assumed to make a horizontal sweep motion, either back and forth or in one single direction. Due to the sweep motion, $S_1$ is not standing still but is moving along the detector plate. During the foregoing scanning of the detector plate, $S_1$ had the position $P_1'$ (see the picture $B_2$). The signal $f_1$, however, is fixed and assumes the position $P_2$ in both pictures.

The signal treatment according to the invention is based upon the generation of an estimate of the error $f_1$ which is as accurate as possible, and then subtracting this estimated error from the video signal. The generation of the estimate is effected as follows.

The signal value at each point of the latest video picture is added to the signal value at the corresponding point of the previous video picture and the result is written into memory. For the position $P_1$ this means that the value $S_1$ in the picture $B_1$ is added to zero in the picture $B_2$ and the result is stored in the corresponding position in the memory. For the point $P_2$ the value $f_1$ in the picture $B_1$ is added to $f_1$ in $B_2$ and the result is stored in the memory. At the next following picture scanning the same thing is repeated but, instead of adding the signal values obtained by the previous picture scanning, the signal values obtained by the previous addition procedure are added to the signal values obtained by the latest picture scanning. The sum is then stored. It is evident that $f_1$ will be present in all adding procedures, while $S_1$ will only be present in two adding procedures. After a large number of adding procedures, the position corresponding to $P_2$ in the memory will contain a large number which is dependent on the value $f_1$, while the position corresponding to $P_1$ will contain a number which can be neglected. After reduction with a suitable reduction factor the number in position $P_2$ will correspond to the initial error value $f_1$ and be subtracted from the video signal. The contribution from $S_1$ will then be negligible because it will be reduced by the same reduction factor.

Figure 2:
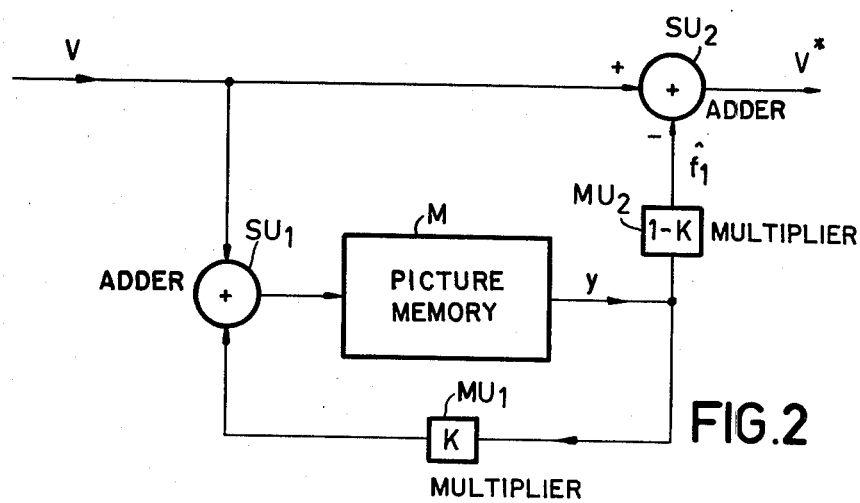
FIG. 2 is a block diagram of error correction device according to the invention.

FIG. 2 shows how the error correction method described with reference to FIG. 1 can be realized point for point in real time by means of a device comprising one single memory for the video signal. The picture memory is, in FIG. 2, designated by M and has a capacity corresponding to a complete scan of the pyroelectric detector. The picture memory can in principle be either analogue or digital and it is of the shift register or delay line type with a delay exactly corresponding to the time for a complete scan of the detector. Due to the cumulative effect of a "leaking" memory, in practice only a digital shift register can be used.

Besides the picture memory the device according to FIG. 2 comprises two adders, one adder $SU_1$ at the input of the memory M and one adder $SU_2$ in the transmission path for the incoming video signal V which is to be error-corrected. To the first adder $SU_1$ is fed on the one hand the incoming video signal V and on the other hand the output signal y from the picture memory after multiplication by a factor K in a multiplier, first multiplying means $MU_1$. The output signal from the adder $SU_1$ is fed to the picture memory M. To the second adder $SU_2$ is fed on the one hand in video signal V and on the other hand the output signal from the picture memory after multiplication by a factor $(1-K)$ in a multiplier, second multiplying means $MU_2$. This signal, which is designated with $\hat{f}_1$ is an estimate of the error signal and is applied to a subtracting input on the adder $SU_2$. Out of the adder $SU_2$ is obtained a signal $V^*$ which is the difference between V and $\hat{f}_1$.

The operation of the device is as follows.

The instantaneous value of the video signal V relating to a certain picture point (for example $P_1$ or $P_2$ in FIG. 1) appears at a given moment at one input of $SU_1$. Simultaneously the signal value relating to the same picture point stored in the memory M and multiplied by the factor K appears at the second input of $SU_1$. The sum is written into the memory M. This adding procedure is effected point for point and is repeated from picture to picture.

At the same time, the instantaneous value of the video signal V relating to the actual picture point appears at one input of the adder $SU_2$. Simultaneously the stored signal value relating to the same point multiplied by the factor $(1-K)$, appears at the second input of $SU_2$. The difference between the two signals applied to the adder $SU_2$ is the corrected output signal $V^*$. This also takes place point for point and is repeated from picture to picture.

The factor K is selected such that it is smaller than one but is nearly equal to one.

It can be proved that a constant signal component in the signal V recurring from picture to picture and thus taking part in all successive additions in $SU_1$ after an infinite number of additions will have the value:

$$y = \frac{x}{1-K}$$

where
 x = the value of the constant signal component and
 y = the value stored in picture memory relating to the constant signal component.

The factor $1/(1-K)$ can be regarded as the "gain" of the picture memory for such a constant signal component.

The above is valid for the error signal $\hat{f}_1$ in FIG. 1, which has been assumed to be constant. The signal $f_1$ is thus stored in the memory as a value having the magnitude $(1/1-K) f_1$. The estimate $\hat{f}_1$ is then produced by multiplying the output signal of the picture memory by the factor $(1-K)$. The contribution of the signal component $f_1$ to the estimate $\hat{f}_1$ thus will be theoretically equal to $f_1$. Furthermore the signal component $S_1$ will be included in the estimate but as this component is not added repeatedly its contribution can be neglected.

After subtraction of the estimate $\hat{f}_1$ from the video signal V in the adder $SU_2$ and with the assumption that $\hat{f}_1 = f_1$ there will be obtained from the adder $SU_2$ a signal which only contains the useful signal component $S_1$. The condition for the above is that K is selected as near the value 1 as possible. The nearer 1 the value K is to unity the longer time it will take for the error correction device to begin to produce a good estimate of the error component $f_1$ (i.e. the longer it will take for the transient response to die out). However, the nearer K is to unity, the better the error correction will ultimately be, because the useful signal will contribute to a lesser extent to the estimate. Thus, the value K should be increased as close as possible to unity without making the device so slow that it loses its ability to take care of variations in the value $f_1$. The nearer the value K is to unity, dynamic space is also required in the picture memory (a larger number of bits per position) which will set a practical limit for K.

Suitable values for K in a digital system are 15/16, 31/32 or 7/8.

Figure 3:
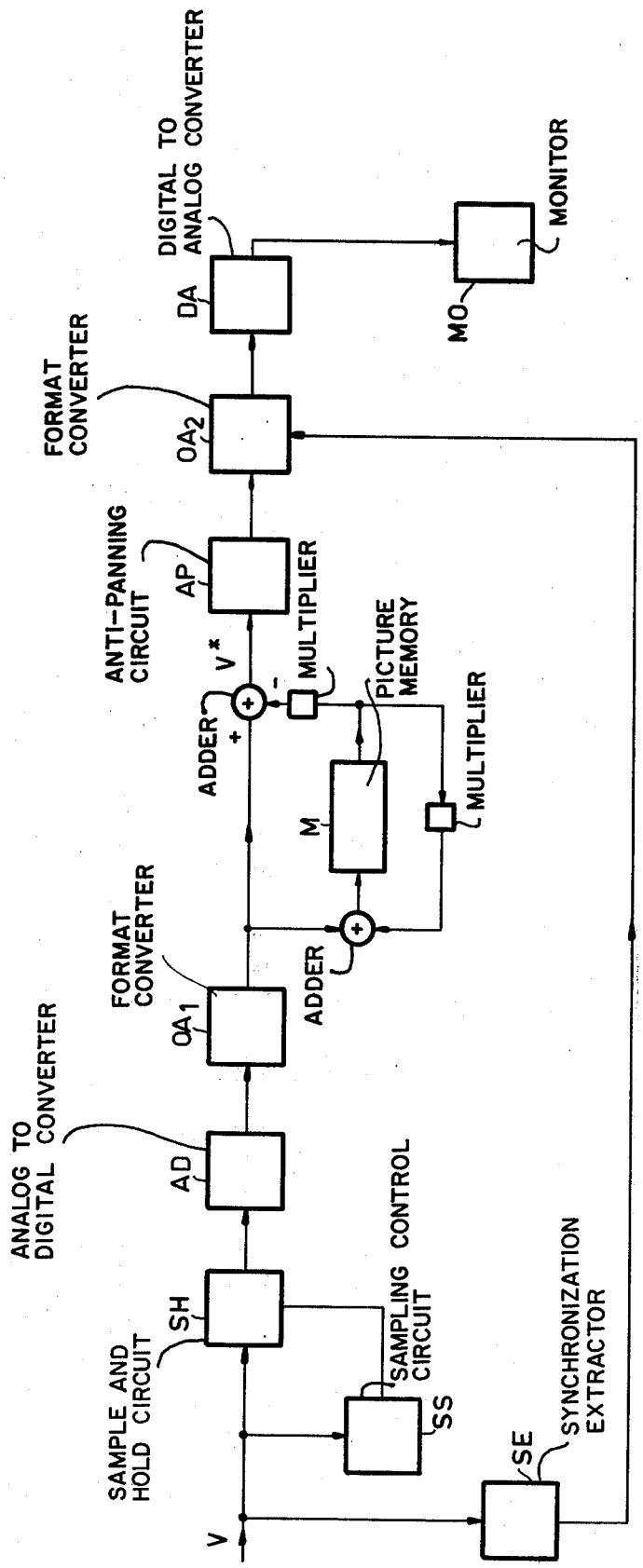
FIG. 3 is a block diagram of a complete signal treatment unit with an error correction device according to the invention.

FIG. 3 shows a block diagram for a complete signal treatment unit with an error correction device according to the invention. The video signal is, according to FIG. 3, fed to a sample-and-hold circuit SH which receives sampling control pulses from a sampling control circuit SS. This is controlled with synchronization information in the video signal. From the sample-and-hold circuit the sampled signal values are led to an analog to digital converter AD where the sampled values are converted to digital form. These digital sample values are then fed to a converter $OA_1$ where a combination of lines to the format 128×128 samples per video picture takes place.

The digital samples from the device $OA_1$ constitute the input signal to an error correction device according to the invention, which is structured as described in connection with FIG. 2. Out of this correction device is obtained a sampled video signal V, in which fixed error sources are eliminated. This error-corrected sampled video signal of format 128×128 samples per picture is fed to an "antipanning" circuit AP. This circuit is controlled with a signal from an angular transducer sensing the instantaneous angular setting of the turn table which is used for supporting the IR camera. In the circuit AP compensation takes place for the known motion of the camera so that that signal information from corresponding points in the initial picture are combined together. After further signal treatment, if any, the sampled video signal passes to a converter $OA_2$ where the signal is again converted to the common video format. The converter $OA_2$ obtains synchronization information from a synchronization extractor SE, which in turn obtains synchronization information from the initial video signal. After re-conversion to analog form in a digital to analog converter DA the signal passes finally to a monitor MO. On the monitor then will appear a heat picture, in which all fixed camera errors and other fixed errors are eliminated.

What is claimed is:

1. A method of eliminating disturbances from fixed error sources in a video signal from an infrared camera of the pyroelectric vidicon type in which a heat picture is projected onto a pyroelectric detector plate, the plate is scanned by means of a beam of electrons for producing the video signal containing information about variations in the heat picture on the plate, and a stationary heat picture is converted to a variable heat picture on the plate, said method comprising the steps of:
    combining a present value of each segment of a video signal corresponding to each point of the picture with a number of values of segments of video signals corresponding to the same points of the picture from a number of previous frames, said combined values forming integrated values of video signal segments corresponding to each point of the picture; and
    subtracting the integrated values of video signal segments from the present values of corresponding video signal segments.

2. A method as claimed in claim 1 wherein:
    the combination of the number of values of segments of video signals from a number of previous frames is first multiplied by a factor, K, which is less than but nearly equal to one before being further combined with the present values of corresponding segments of the present video signal; and
    the integrated value of each video signal segment is first multiplied by a reduction factor which is substantially less than one before being subtracted from each present value of each corresponding video signal segment.

3. A device for eliminating disturbances from fixed error sources in a video signal from an infrared camera of the pyroelectric vidicon type in which a heat picture is projected onto a pyroelectric detector plate, the plate is scanned by means of a beam of electrons for producing the video signal containing information about variations in the heat picture on the plate, and a stationary heat picture is converted to a variable heat picture on the plate, said device comprising:
    a picture memory having an input, an output signal, a capacity for storing a video signal corresponding to a complete scan of the detector plate, and a delay equal to the time for a complete scan of the detector plate;
    first multiplying means having an input and an output signal, said input of said first multiplying means receiving, in operation, the output signal from the picture memory, said output of said first multiplying means being a signal which is, in operation, the output signal of the picture memory multipled by a factor, K, which is less than but nearly equal to one;
    first adding means having inputs and an output signal, said inputs of said first adding means receiving, in operation, the instantaneous value of the video signal at each moment and the output signal from the first multiplying means, said output of said first adding means being a signal which is the sum of its input signals and which is applied to the input of the picture memory;
    second multiplying means having an input and an output signal, said input of said second multiplying means receiving, in operation, the output signal from the picture memory, said output of said second multiplying means being a signal which is, in operation, the output signal from the picture memory multiplied by a reduction factor which is substantially less than one; and
    second adding means having inputs and an output signal, said input of said second adding means receiving, in operation, the instantaneous value of the video signal at each moment and the output signal from the second multiplying means, said output of said second adding means being a corrected video signal which is the difference between its input signals.

4. A device as claimed in claim 3, wherein the picture memory is a shaft register.

5. A device as claimed in claim 3, wherein the picture memory is a delay line.

6. The invention of claim 2, 4 or 5, wherein the reduction factor is equal to $(1-K)$.

7. The invention of claim 6, wherein the invention acts on digital signals.

8. The invention of claim 7, wherein the factor K is 15/16.

9. The invention of claim 7, wherein the factor K is 31/32.

10. The invention of claim 7, wherein the factor K is 7/8.

11. A method of eliminating disturbances from fixed error sources in a variable video signal, said method comprising the steps of:

combining a present value of each segment of a video signal corresponding to each point of the picture with a number of values of segments of video signals corresponding to the same points of the picture from a number of previous frames, said combined values forming integrated values of video signal segments corresponding to each point of the picture; and subtracting the integrated values of video signal segments from the present values of corresponding video signal segments.

12. A method as claimed in claim 1 wherein:

the combination of the number of values of segments of video signals from a number of previous frames is first multiplied by a factor, K, which is less than but nearly equal to one before being further combined with the present values of corresponding segments of the present video signal; and the integrated value of each video signal segment is first multiplied by a reduction factor which is substantially less than one before being subtracted from each prelsent value of each corresponding video signal segment.

13. A device for eliminating disturbances from fixed error sources in a variable video signal, said device comprising:

a picture memory having an input, an output signal, a capacity for storing a video signal corresponding to a complete scan of the detector plate, and a delay equal to the time for a complete scan of the detector plate;

first multiplying means having an input and an output signal, said input of said first multiplying means receiving, in operation, the output signal from the picture memory, said output of said first multiplying means being a signal which is, in operation, the output signal of the picture memory multiplied by a factor, K, which is less than but nearly equal to one;

first adding means having inputs and an output signal, said inputs of said first adding means receiving, in operation, the instantaneous value of the video signal at each moment and the output signal from the first multiplying means, said output of said first adding means being a signal which is the sum of its input signals and which is applied to the input of the picture memory;

second multiplying means having an input and an output signal, said input of said second multiplying means recieving, in operation, the output signal from the picture memory, said output of said second multiplying means being a signal which is, in operation, the output signal from the picture memory multiplied by a reduction factor which is substantially less than one; and second adding means having inputs and an output signal, said input of said second adding means receiving, in operation, the instantaneous value of the video signal at each moment and the output signal from the second multiplying means, said output of said second adding means being a corrected video signal which is the difference between its input signals.

14. The invention of claim 12 or 13, wherein the reduction factor is equal to $(1-K)$.

* * * * *